(12) United States Patent
Huang

(10) Patent No.: US 9,695,893 B2
(45) Date of Patent: Jul. 4, 2017

(54) FAST-POSITIONING BRAKE SLAVE CYLINDER ADJUSTER

(71) Applicant: POUL CHANG METAL INDUSTRY CO., LTD., Taichung (TW)

(72) Inventor: Chia-Hao Huang, Taichung (TW)

(73) Assignee: POUL CHANG METAL INDUSTRY CO., LTD., Taichung (TW)

( * ) Notice: Subject to any disclaimer, the term of this patent is extended or adjusted under 35 U.S.C. 154(b) by 72 days.

(21) Appl. No.: 14/697,177

(22) Filed: Apr. 27, 2015

(65) Prior Publication Data

US 2016/0312843 A1  Oct. 27, 2016

(51) Int. Cl.
*B25B 27/00* (2006.01)
*F16D 65/00* (2006.01)
*B25B 27/02* (2006.01)

(52) U.S. Cl.
CPC ...... *F16D 65/0043* (2013.01); *B25B 27/0035* (2013.01); *B25B 27/023* (2013.01)

(58) Field of Classification Search
CPC .... B25B 27/0042; B25B 1/12; F16D 65/0043
USPC ....... 29/217, 238, 239, 256, 264; 403/1, 299
See application file for complete search history.

(56) References Cited

U.S. PATENT DOCUMENTS

| | | | |
|---|---|---|---|
| 1,623,440 A * | 4/1927 | Ray | B25B 27/023 29/264 |
| 2,560,413 A * | 7/1951 | Carlson | F16B 19/02 29/445 |
| 6,095,017 A * | 8/2000 | Long | B25B 27/0035 81/176.15 |
| 6,574,846 B1 * | 6/2003 | Kang | B25B 27/0021 29/239 |
| 7,210,361 B2 * | 5/2007 | Kang | G01L 5/06 73/862.392 |
| 9,309,937 B2 * | 4/2016 | Chen | F16D 65/0043 |
| 9,376,300 B2 * | 6/2016 | Yang | F16D 65/0043 |
| 2008/0083070 A1 * | 4/2008 | Huang | B25B 27/0035 7/100 |
| 2013/0263704 A1 * | 10/2013 | Chen | B25B 27/0035 81/177.5 |
| 2015/0033914 A1 * | 2/2015 | Chen | B25B 27/0035 81/52 |

\* cited by examiner

*Primary Examiner* — Joseph J Hail
*Assistant Examiner* — Tyrone V Hall, Jr.
(74) *Attorney, Agent, or Firm* — Muncy, Geissler, Olds & Lowe, P.C.

(57) ABSTRACT

A fast-positioning brake slave cylinder adjuster includes a driving rod, an operation grip, a positioning mechanism, and a baffle. Therein, the driving rod engages a driving disk for being coupled with a brake slave cylinder, while the driving rod has a first thread section and a second thread section with different rotation directions. The operation grip drives the driving rod. The positioning mechanism is mounted around the driving rod, and capable of generating a clutching movement. When being de-clutched with the driving rod, the positioning mechanism is allowed to fast move axially along the driving rod; when being clutched with the driving rod, the positioning mechanism is allowed to be screwed to the first or second thread sections. The baffle is mounted around the outer periphery of the positioning mechanism. Therefore, with a fast adjusting function achieved, the adjusting operation is facilitated.

9 Claims, 7 Drawing Sheets

FAST-POSITIONING BRAKE SLAVE CYLINDER ADJUSTER

BACKGROUND OF THE INVENTION

1. Field of the Invention

The present invention relates to brake slave cylinder adjusters, and more particularly, to a fast-positioning brake slave cylinder adjuster.

2. Description of the Related Art

Figure 1:
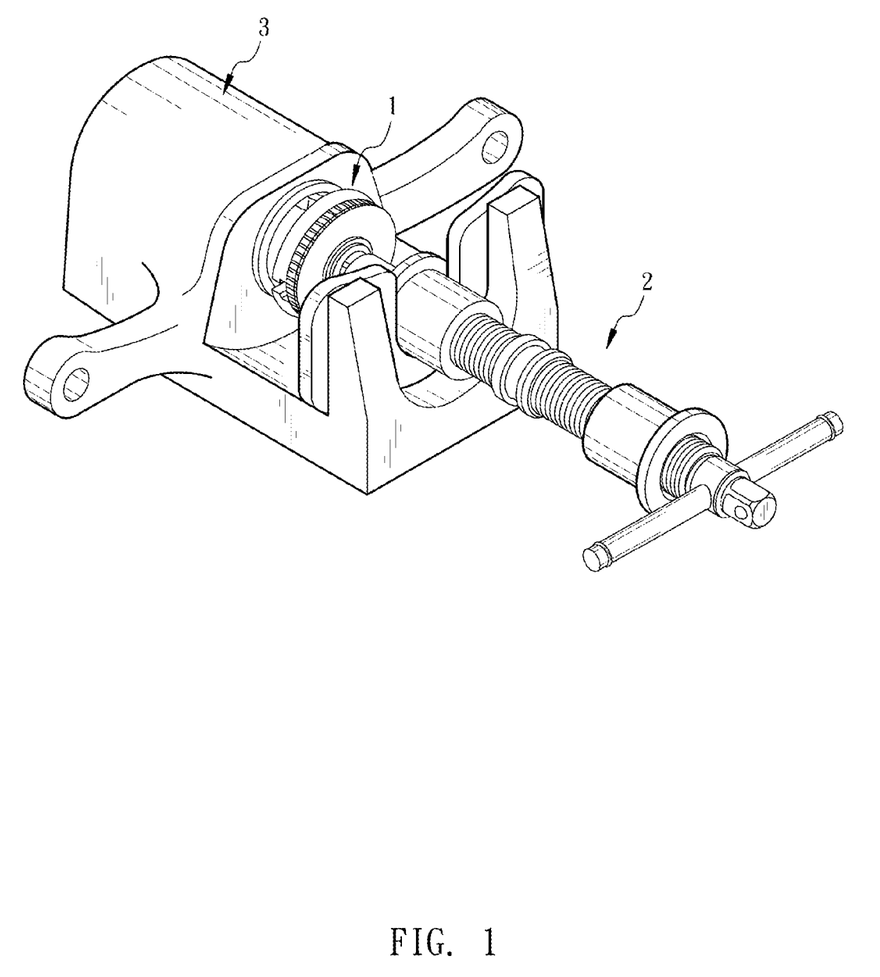
FIG. 1 is a perspective view of a conventional brake slave cylinder adjuster applied for adjusting a brake slave cylinder.
Figure 2:
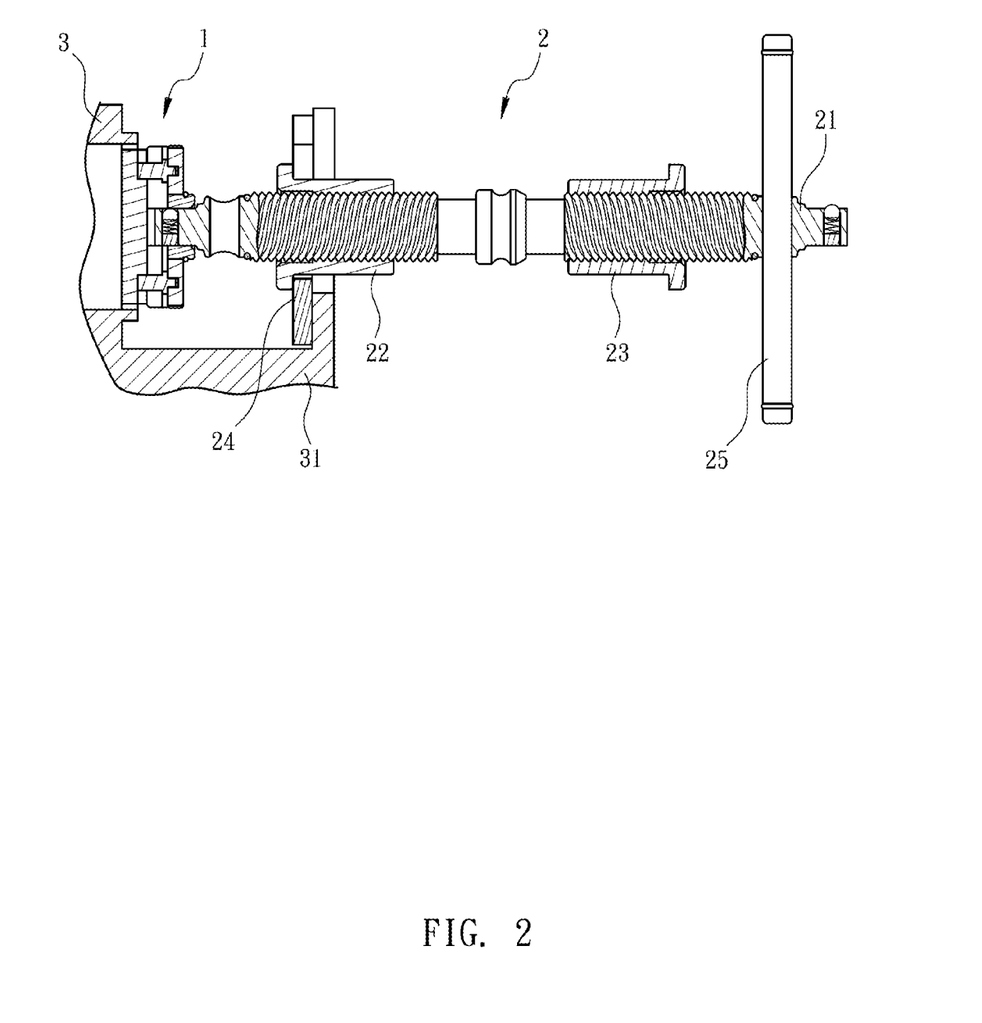
FIG. 2 is a sectional schematic view of a conventional brake slave cylinder adjuster applied for adjusting a brake slave cylinder.
Figure 3:
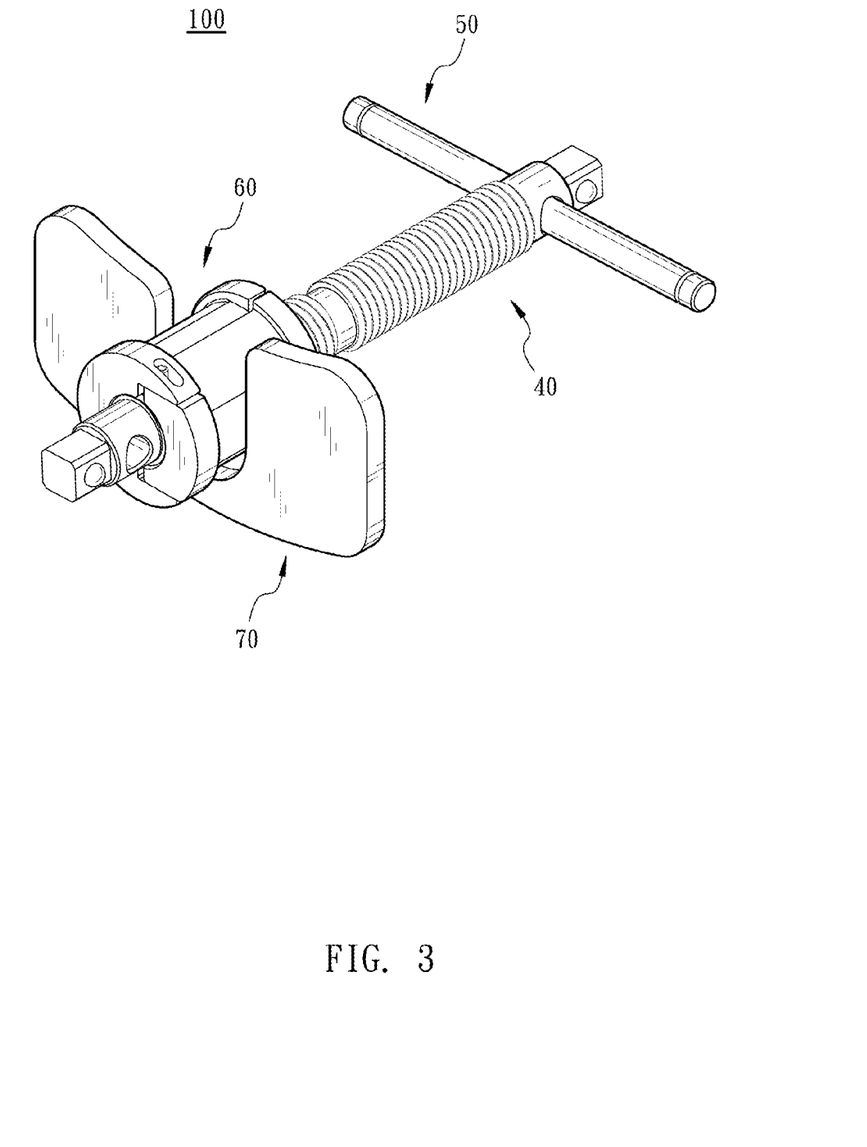
FIG. 3 is a perspective view of a brake slave cylinder adjuster in accordance with the present invention.

Referring to FIG. 1 and FIG. 2, a conventional brake slave cylinder adjuster is disclosed, mainly for pressing the piston of a brake slave cylinder 3 back to the piston chamber, such that the maintenance of new brake linings is facilitated. Therein, the brake slave cylinder adjuster comprises an engaging unit 1, and a driving unit 2 combined to the engaging unit 1 for rotationally driving the engaging unit 1. The engaging unit 1 is axially combined to the brake slave cylinder 3. The driving unit 2 is formed of a rod 21, a left positioning sleeve 22, a right positioning sleeve 23, a positioning baffle 24, and a grip 25.

Therein, when the device is applied for adjusting the brake slave cylinder 3 on the left side of a car, the engaging unit 1 is connected to an end of the rod 21, so as to connect the brake slave cylinder 3; also, the positioning baffle 24 is engaged with the left positioning sleeve 22, and the left positioning sleeve 22 is stopped against an engaging seat 31 disposed on the outer periphery of the slave cylinder, thereby driving the grip 25 for pressing the piston into the slave cylinder. Similarly, when the device is applied for adjusting the brake slave cylinder 3 on the right side of the car, the positioning baffle 24 is engaged with the right positioning sleeve 23; also, the right positioning sleeve 23 is stopped against an engaging seat 31 disposed on the outer periphery of the slave cylinder, thereby driving the grip 25 for pressing the piston into the slave cylinder. With the cooperation of the two positioning sleeves, a single rod 21 and the driving unit 2 are applied to adjust the brake slave cylinders 3 on the left and right sides of the car.

Such conventional structure is allowed to be used for adjusting either the left or right brake slave cylinder of a vehicle; however, two positioning sleeves with different directions of thread are necessarily required, so that the manufacturing cost remains higher. Also, when adjusting by use of the left positioning sleeve 22 or right positioning sleeve 23 on the rod 21, the rotation is only accomplished in a manner of a gradually round-by-round rotation, so that the operation period is longer.

SUMMARY OF THE INVENTION

For improving aforementioned issues, the present invention discloses a fast-positioning brake slave cylinder adjuster, which applies a single positioning mechanism mounted around a driving rod with a clutch mechanism, so as to effectively being positioned, thus facilitating the adjusting process.

For achieving the objectives above, the present invention provides a fast-positioning brake slave cylinder adjuster, comprising:

a driving rod, with two combining parts disposed on two ends thereof, respectively, for combining a driving disk, so as to connect a brake slave cylinder, while the driving rod is provided with a first thread section and a second thread section, and the two threads thereof have different thread directions;

an operation grip, transversely passing through one end of the driving rod for driving the driving rod;

a positioning mechanism for clutching or declutching the driving rod, mounted around the driving rod and able to be clutched with the driving rod, such that when the positioning mechanism is de-clutched with the driving rod, the positioning mechanism is able to axially move along the driving rod effectively, and when the positioning mechanism is clutched with the driving rod, the positioning mechanism is screwedly mounted around the first thread section or the second thread section; and a baffle, mounted around the outer periphery of the positioning mechanism.

Preferably, the positioning mechanism is formed by a thread seat and a fixing seat coupled together into a barrel shape, and half of the inner wall of the thread seat is provided with an inner thread for being screwedly mounted around the first thread section or the second thread section.

With such configuration, the positioning mechanism is allowed to be clutched with the driving rod, such that the cylinder adjuster is effectively positioned, so as to facilitate the adjusting process and save the time cost.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 3 to FIG. 10, the present invention provides a fast-positioning brake slave cylinder adjuster 100, comprising a driving rod 40, an operation grip 50, a positioning mechanism 60, and a baffle 70.

Figure 8:
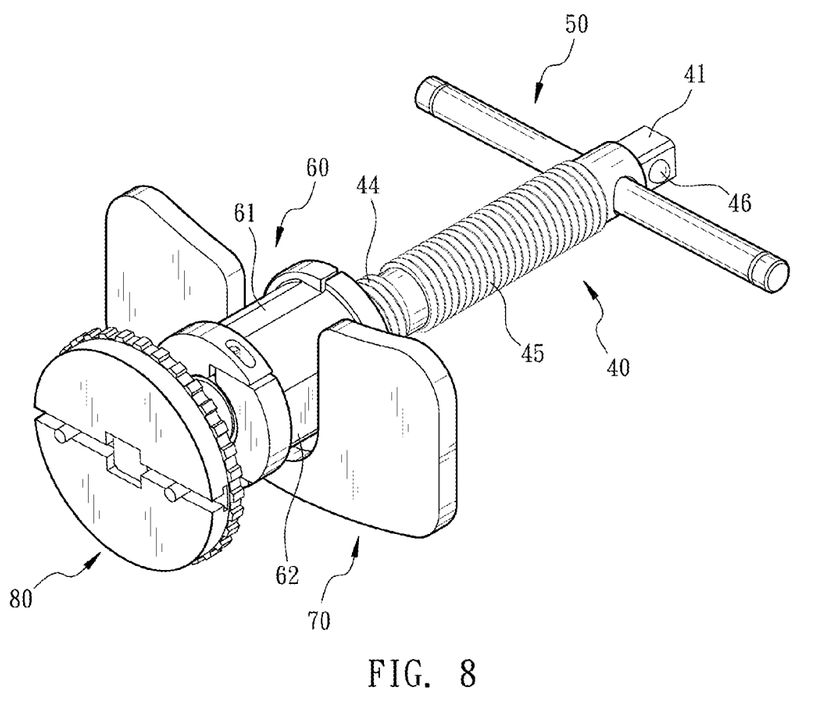
FIG. 8 is a perspective view of the brake slave cylinder adjuster combined with a driving disk in accordance with the present invention.
Figure 9:
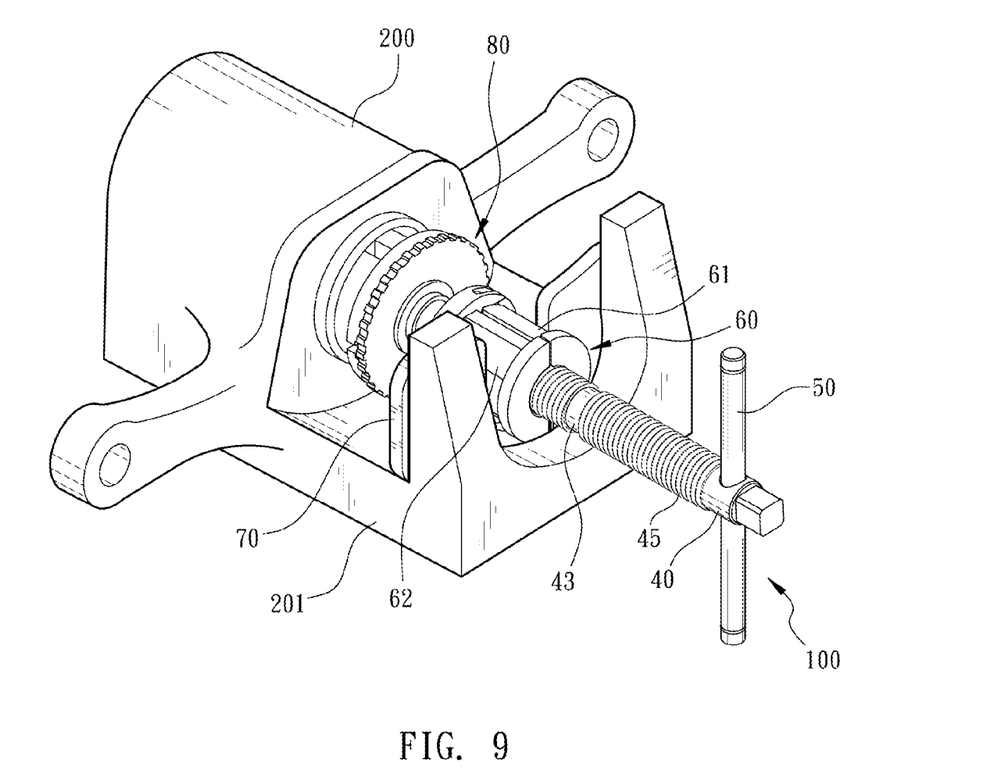
FIG. 9 is a perspective view of the brake slave cylinder adjuster for adjusting a left brake slave cylinder of a vehicle.
Figure 10:
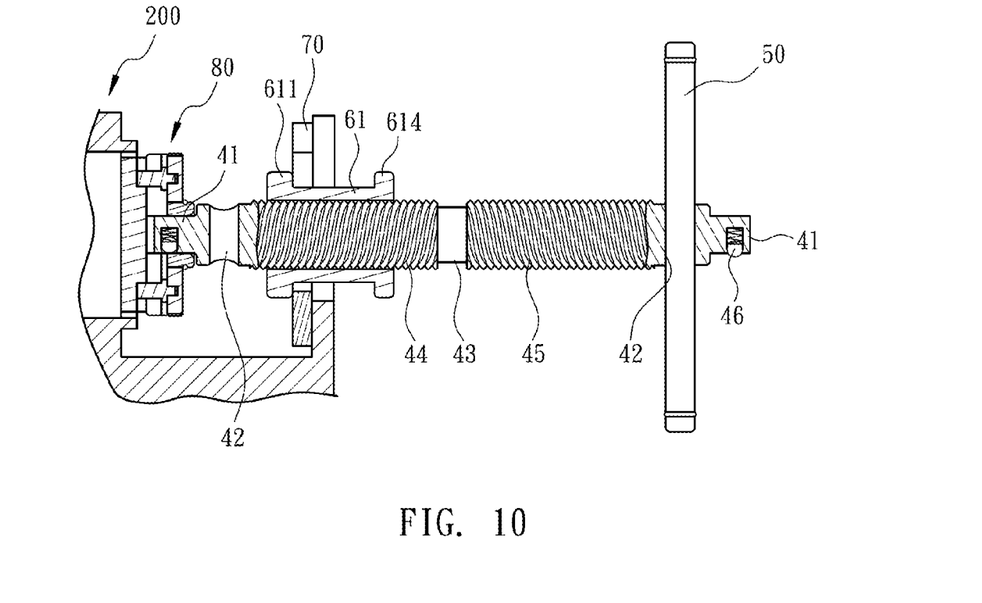
FIG. 10 is a sectional schematic view illustrating the brake slave cylinder adjuster for adjusting a left brake slave cylinder of a vehicle.

Two ends of the driving rod 40 are provided with a combining part 41, respectively, for combining a driving disk 80 in order to engage a brake slave cylinder 200, as shown in FIG. 8 to FIG. 10. A through hole 42 is disposed on a lateral side of each of the combining parts 41 of the driving rod 40, respectively. Moreover, an interval 43 is disposed on the middle section of the driving rod 40, so as to partition the two sides of the driving rod 40 into a first thread section 44 and a second thread section 45. In the embodiment provided by the present invention, the directions of the thread on the first thread section 44 and the second thread section 45 are different. In the preferred embodiment, the rotational direction of the thread on the first thread section 44 is counter clockwise, while the rotational direction of the thread on the second thread section 45 is clockwise. Furthermore, each of the combining parts 41 of the driving rod 40 is embedded with a resiliently stretchable positioning ball 46, respectively, so as to resiliently engage the driving disk 80.

Figure 4:
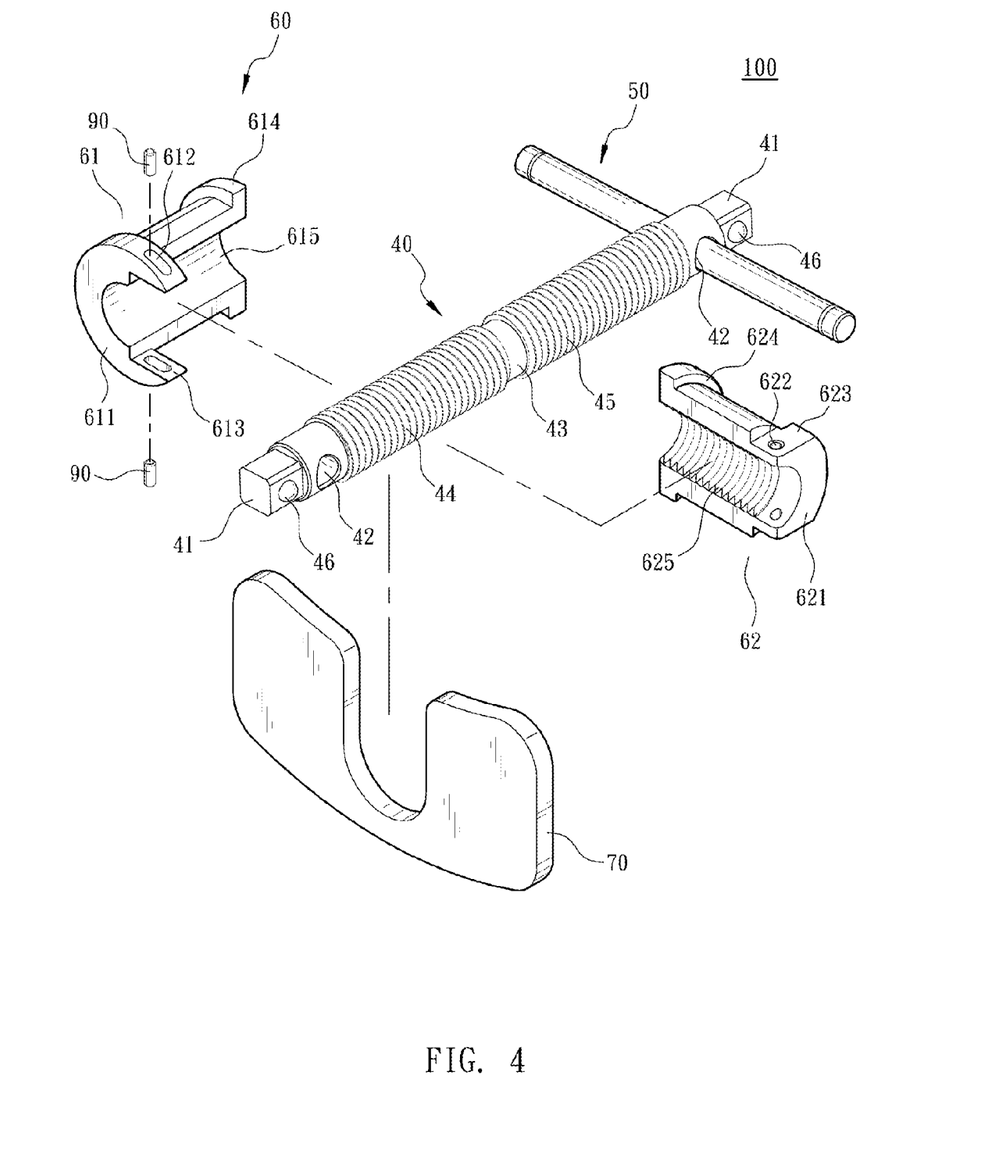
FIG. 4 is an exploded view of the brake slave cylinder adjuster in accordance with the present invention.

The operation grip 50 transversely passes through one of the two through holes 42 of the driving rod 40 for driving the driving rod 40.

The positioning mechanism 60, which refers to a sleeve in an embodiment of the present invention, is mounted around the driving rod 40 and capable of clutching the driving rod 40. In the embodiment provided by the present invention, the positioning mechanism 60 is in a barrel shape, which is formed of a fixing seat 61 and a thread seat 62. The fixing seat 61 has one end thereof provided with a first block edge 611, while two sides of the first block edge 611 are provided with a groove 612, respectively. Also, two sides of the inner edge of the first block edge 611 are provided with a flat surface 613, respectively. The other end of the fixing seat 61 opposed to the first block edge 611 is provided with a first convex edge 614. Further, the inner edge of the fixing seat 61 is axially provided with a semi-barrel hole 615.

The thread seat 62 has one end provided with a second block edge 621 corresponding to the first block edge 611, while the second block edge 621 is provided with two combining bores 622 corresponding to the two grooves 612, such that two positioning pins 90 pass through the two grooves 612 and two combining bores 622. In addition, two sides of the second block edge 621 of the thread seat 62 are provided with an outer lateral surface 623, respectively, for matching a corresponding flat surface 613; also, the thread seat 62 is further provided with a second convex edge 624 corresponding to the first convex edge 614. Therein, inner wall of the thread seat 62 has an inner thread 625 corresponding to the semi-barrel hole 615, wherein the thread pitch of the inner thread 625 allows the inner thread 625 to be screwedly mounted around the first thread section 44 or the second thread section 45. Therefore, the thread seat 62 and the fixing seat 61 form a barrel shape to be mounted around the periphery of the driving rod 40, wherein the thread seat 62 and the fixing seat 61 are able to be transversely engaged with or disengaged from each other. Therein, when the thread seat 62 and the fixing seat 61 are de-clutched against the driving rod 40, the positioning mechanism 60 is allowed to axially move along the driving rod 40 effectively, so as to adjust the positioning mechanism 60 onto the first thread section 44 or the second thread section 45. When the thread seat 62 and the fixing seat 61 are clutched against the driving rod 40, the thread seat 62 is allowed to be screwedly mounted around the first thread section 44 or the second thread section 45.

The baffle 70 is mounted around the outer periphery of the positioning mechanism 60.

Figure 5:
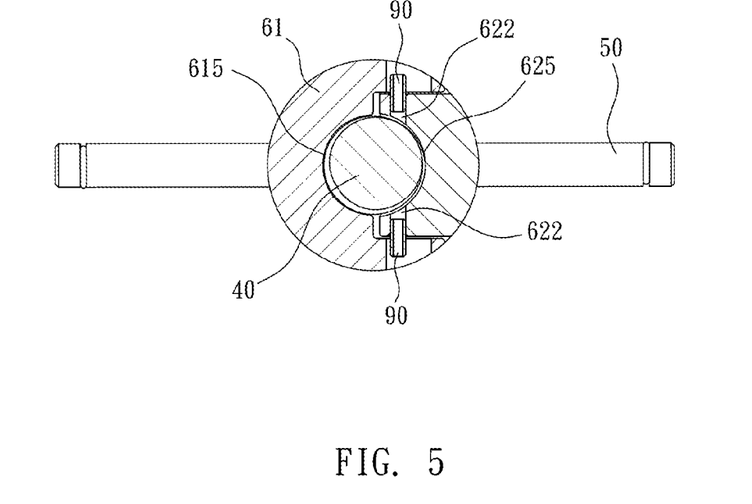
FIG. 5 is a schematic view illustrating the positioning mechanism in a clutched status in accordance with the present invention.
Figure 6:
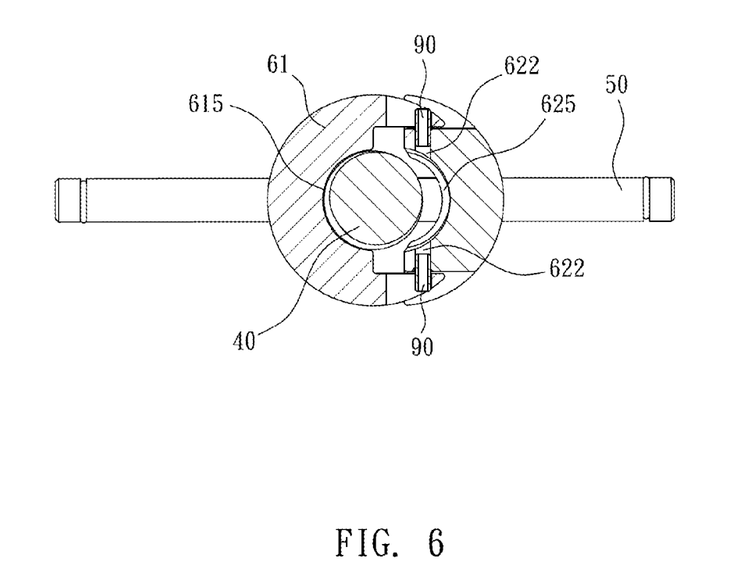
FIG. 6 is a schematic view illustrating the positioning mechanism in a de-clutched status in accordance with the present invention.
Figure 7:
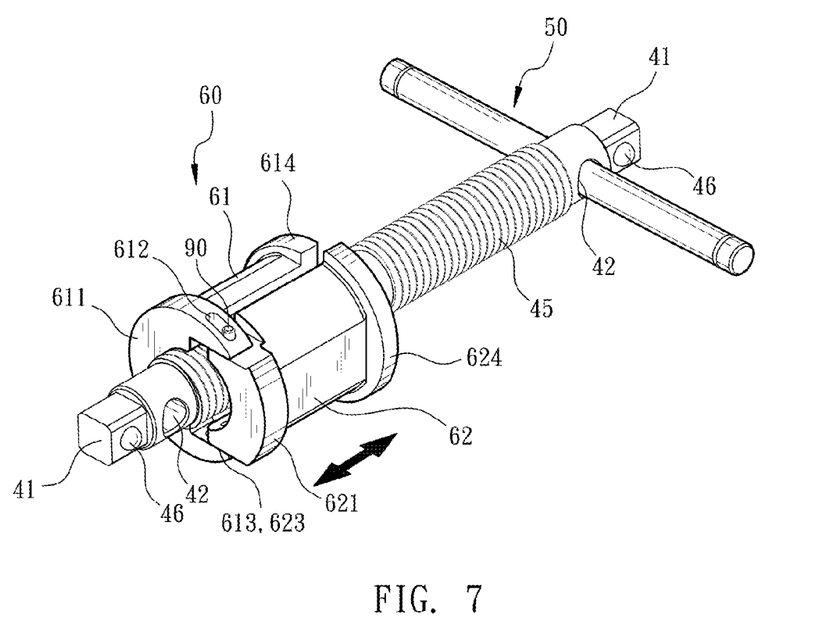
FIG. 7 is a schematic view illustrating the status of the positioning mechanism during an adjusting operation in accordance with the present invention.

Referring to FIG. 5 to FIG. 7, before the adjusting process is carried out, the thread seat 62 and the fixing seat 61 are transversely pulled outward against the driving rod 40, thereby de-clutching the positioning mechanism 60 from the driving rod 40, so as to axially adjust the positioning mechanism 60 along the driving rod 40 onto the first thread section 44 or the second thread section 45. Next, the user pushes the thread seat 62 and the fixing seat 61 toward the driving rod 40, thereby re-clutching the thread seat 62 and the fixing seat 61 with the driving rod 40, such that the thread seat 62 is screwedly mounted around the driving rod 40 to be positioned.

Referring to FIG. 9 to FIG. 10, with the steps aforementioned, the positioning mechanism 60 is adjusted to an appropriate position; for example, the positioning mechanism 60 is positioned to the first thread section 44 (on the left side of the drawing), such that the brake slave cylinder adjuster 100 of the present invention is applied for adjusting the brake slave cylinder 200 on the left side of the vehicle. During the adjusting process, an appropriately chosen driving disk 80 is engaged with the left end of the driving rod 40. The baffle 70 is mounted around the outer periphery of the positioning mechanism 60, and is subsequently engaged with an engaging seat 201 of the brake slave cylinder 200, whereby the driving disk 80 is engaged with the brake slave cylinder 200. The operation grip 50 is combined to the right end of the driving rod 40, such that the operation grip 50 is operated to drive the driving rod 40 to rotate and move toward the left side. With such operation, the driving disk 80 presses the piston of the brake slave cylinder 200 back to the original position, whereby the adjustment of the brake slave cylinder 200 on the left side of the vehicle is accomplished. Similarly, when adjusting the brake slave cylinder 200 on the right side of the vehicle, the operation method is same with the method of adjusting the left side brake slave cylinder 200.

Therefore, the brake slave cylinder adjuster 100 provided by the present invention needs only one positioning mechanism 60 to facilitate the position adjustment of the left side or right side brake slave cylinder 200 of a vehicle. In other words, components of the brake slave cylinder adjuster 100 provided by the present invention are simplified, lowering the manufacturing cost and price. Furthermore, the positioning mechanism 60 is formed of the fixing seat 61 and the thread seat 62, and capable of being clutched with the driving rod 40, so as to be effectively positioned at the appropriate position, thereby facilitating the adjusting process and achieving a higher utility.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fast-positioning brake slave cylinder adjuster, comprising:
   a driving rod, with two combining parts disposed on two ends thereof, respectively, for combining a driving disk, so as to engage a brake slave cylinder, while the driving rod is provided with a first thread section and a second thread section, while directions of the first thread section and the second thread section are different;
   an operation grip, transversely passing through one end of the driving rod for driving the driving rod;

a positioning mechanism for clutching or declutching the driving rod, mounted around the driving rod and able to be clutched with the driving rod, such that when the positioning mechanism is not clutched with the driving rod, the positioning mechanism is able to axially move along the driving rod effectively, and when the positioning mechanism is clutched with the driving rod, the positioning mechanism is allowed to be screwedly mounted around the first thread section or the second thread section; and a baffle, mounted around the outer periphery of the positioning mechanism.

2. The fast-positioning brake slave cylinder adjuster of claim 1, wherein the positioning mechanism is in a barrel shape formed of a thread seat and a fixing seat.

3. The fast-positioning brake slave cylinder adjuster of claim 2, wherein inner wall of the thread seat is provided with an inner thread for being screwedly mounted around the first thread section or the second thread section.

4. The fast-positioning brake slave cylinder adjuster of claim 2, wherein the thread seat and the fixing seat are combined with each other by use of two positioning pins.

5. The fast-positioning brake slave cylinder adjuster of claim 4, wherein one end of the fixing seat is provided with a first block edge, with two sides of the first block edge provided with a groove, respectively, and the thread seat is provided with a second block edge corresponding to the first block edge, with two combining bores disposed on the second block edge, while the two positioning pins pass through the two grooves and the corresponding two combining bores, respectively, such that the thread seat and the fixing seat are allowed to be transversely engaged with or disengaged from each other.

6. The fast-positioning brake slave cylinder adjuster of claim 5, wherein one end of the fixing seat opposed to the first block edge is provided with a first convex edge, and the thread seat is provided with a second convex edge corresponding to the first convex edge.

7. The fast-positioning brake slave cylinder adjuster of claim 5, wherein two sides of the inner edge of the first block edge are provided with a flat surface, respectively, and two sides of the second block edge are provided with an outer lateral surface corresponding to the two flat surfaces, respectively.

8. The fast-positioning brake slave cylinder adjuster of claim 1, wherein two ends of the driving rod are provided with a through hole, respectively, for the operation grip to selectively pass through one of the through holes.

9. The fast-positioning brake slave cylinder adjuster of claim 1, wherein an interval is disposed between the first thread section and the second thread section.

\* \* \* \* \*